(12) United States Patent
Sandhu

(10) Patent No.: US 7,349,720 B2
(45) Date of Patent: Mar. 25, 2008

(54) POWER EFFICIENT SIGNAL ACQUISITION WITH MULTIPLE RECEIVE ANTENNAS

(75) Inventor: Sumeet Sandhu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 630 days.

(21) Appl. No.: 10/955,933

(22) Filed: Sep. 30, 2004

(65) Prior Publication Data

US 2006/0068854 A1     Mar. 30, 2006

(51) Int. Cl.
*H04B 1/38*     (2006.01)
*H04M 1/00*     (2006.01)
*H04L 12/413*   (2006.01)

(52) U.S. Cl. .................. 455/562.1; 455/574; 455/132; 370/445

(58) Field of Classification Search ................ 455/434, 455/515, 550.1, 562.1, 132–134, 226.1, 226.2, 455/272, 277.1, 277.2, 574; 370/445
See application file for complete search history.

(56) References Cited

U.S. PATENT DOCUMENTS

2004/0204105 A1* 10/2004 Liang et al. ............. 455/562.1

\* cited by examiner

*Primary Examiner*—Nguyen T. Vo
(74) *Attorney, Agent, or Firm*—John C. Scott; The Law Offices of John C. Scott

(57) ABSTRACT

In a wireless device having multiple receive antennas, wireless medium sensing operations are performed using a reduced number of receive antennas. Receive chains associated with unused receive antennas are deactivated to reduce power consumption within the device.

22 Claims, 2 Drawing Sheets

POWER EFFICIENT SIGNAL ACQUISITION WITH MULTIPLE RECEIVE ANTENNAS

TECHNICAL FIELD

The invention relates generally to wireless communication and, more particularly, to techniques for reducing power consumption in multiple antenna wireless systems.

BACKGROUND OF THE INVENTION

Wireless devices for use within wireless networks are often battery powered. The less power these devices consume, the longer they can operate without a battery recharge. Therefore, it is desirable that techniques be developed for reducing power consumption within wireless user devices during normal operation.

DETAILED DESCRIPTION

Figure 1:
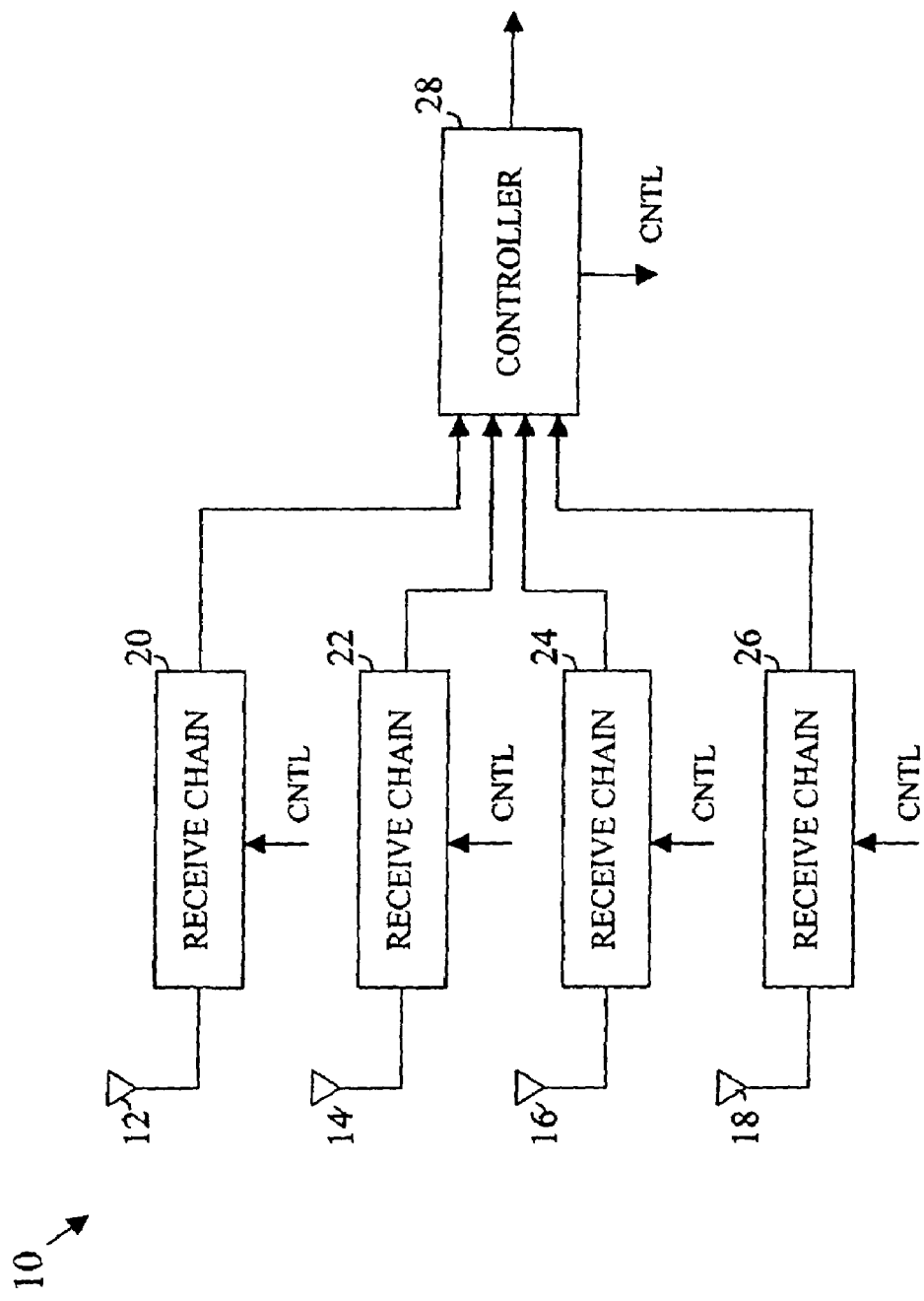
FIG. 1 is a block diagram illustrating an example multiple antenna receiver arrangement in accordance with an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Next generation wireless networking standards may move toward the use of multiple antennas for transmitting and receiving wireless signals. It is believed that multiple antenna technologies are capable of providing substantial gains in network performance including longer range, greater reliability, and higher throughput. One such technology that is being considered is multiple input, multiple output (MIMO). In a MIMO-based system, both the wireless transmitter and the wireless receiver within a wireless link use multiple antennas. By using multiple antennas in both the transmitter and the receiver, the spatial dimension may be taken advantage of in a manner that improves overall performance within the wireless link. In a wireless device having multiple receive antennas, the wireless receiver will typically have a separate dedicated analog receive chain for each of the receive antennas.

Many of the current wireless networking standards rely on a medium access technique known as carrier sense multiple access with collision avoidance (CSMA/CA). In a system using CSMA/CA, before a signal is transmitted onto a wireless medium, a wireless device will first sense the medium to determine whether it is currently free or busy. If the medium is free, the wireless device can transmit the signal. If the medium is busy, the device has to wait before transmitting. Medium sensing may also be performed during signal acquisition operations in a wireless device. In systems following the IEEE 802.11 wireless networking standard (and its progeny) and some other standards, the method for sensing the medium is called "clear channel assessment" or CCA. Other wireless standards may use different terminology to describe the medium sensing functions associated with CSMA/CA. In one aspect of the present invention, power savings are achieved in a multiple receive antenna system by using less than all of the available receive antennas during medium sensing (e.g., CCA) activities.

FIG. 1 is a block diagram illustrating an example multiple antenna receiver arrangement 10 in accordance with an embodiment of the present invention. The receiver arrangement 10 may be part of, for example, a wireless communication device or system. As shown, the receiver arrangement 10 includes: a plurality of receive antennas 12, 14, 16, 18; a plurality of analog receive chains 20, 22, 24, 26; and a controller 28. Each of the receive antennas 12, 14, 16, 18 is coupled to a corresponding one of the receive chains 20, 22, 24, 26. Any type of antennas may be used including, for example, dipoles, patches, helical antennas, antenna arrays, and/or others. Each receive chain 20, 22, 24, 26 is operative for processing radio frequency signals received by an associated antenna 12, 14, 16, 18 to generate digital signals at an output thereof for delivery to the controller 28. Down-conversion to baseband may be performed using either digital or analog down-conversion techniques.

The controller 28 may digitally process the signals received from the receive chains 20, 22, 24, 26 to recover user data carried therein. The controller 28 may also control some or all of the other elements within the wireless device. The controller functionality may be implemented using, for example, one or more digital processing devices (e.g., a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above). Although illustrated with four receive antennas, it should be appreciated that any number of receive antennas (i.e., 2 or more) may be present within a multiple antenna device. It should also be understood that the multiple antenna receiver arrangement 10 of FIG. 1 illustrates only one type of receiver architecture that may be used in accordance with the present invention. Other architectures may alternatively be used.

During normal receive operations when "data" is being received from a remote device, all of the receive chains 20, 22, 24, 26 will typically be active in order to achieve the range and throughput benefits of the multi-antenna arrangement. However, in accordance with at least one aspect of the present invention, one or more of the available receive chains 20, 22, 24, 26 will be deactivated during medium sensing functions (e.g., CCA functions in an IEEE 802.11 compliant device) to conserve power within the device. The deactivation of a receive chain will typically include the removal of power from, or reduction in power to, one or more (or all) of the functional elements within the receive chain. With reference to FIG. 1, the controller 28 may know, for example, when a medium sensing operation is to be performed and activate only a subset of the available receive chains 20, 22, 24, 26 to sense the wireless medium during the operation. The controller 28 may then process the outputs of the activated receive chain(s) to make the CCA determination (i.e., whether or not the medium is currently in use).

During a typical CCA operation, a CCA statistic may be calculated based on a received signal. The CCA statistic may be calculated by performing a correlation of received signal energy with a known preamble sequence or by performing an autocorrelation using a received signal. In one possible approach, an autocorrelation-based CCA determination for a receive antenna may be made as follows. The signal portion $s_n^m$ of a received signal follows the relationship:

$$s_n^m = \sum_{l=1}^{L} h_l^m x_{n-1}$$

where x is the transmitted short preamble signal and $h^m$ is the L-tap frequency selective channel on the $m^{th}$ receive antenna. The signal $y_n^m$ received by the $m^{th}$ receive antenna is:

$$y_n^m = (s_n^m + v_n^m) e^{j\omega_0 n}$$

where v is the noise at the receiver and $\omega_0$ is the carrier frequency offset. The autocorrelation statistic r used to perform CCA may be calculated as follows:

$$r_n^m = \frac{1}{D} \sum_{k=0}^{D-1} y_{n-k}^m conj(y_{n-k-C}^m)$$

where conj(x) is the conjugate of x, C describes the periodicity of the short training, and D defines the length of integration of the autocorrelation output. The statistic r may be used to detect the presence or absence of a valid IEEE 802.11 signal as follows: if the value of r increases over time (for an IEEE 802.11 a signal, in particular, if the statistic increases from a value observed 2.4 microseconds ago) and if the value exceeds a preset threshold, then an IEEE 802.11 signal is determined to be present. Other techniques for calculating and using CCA statistics may alternatively be used.

Figure 2:
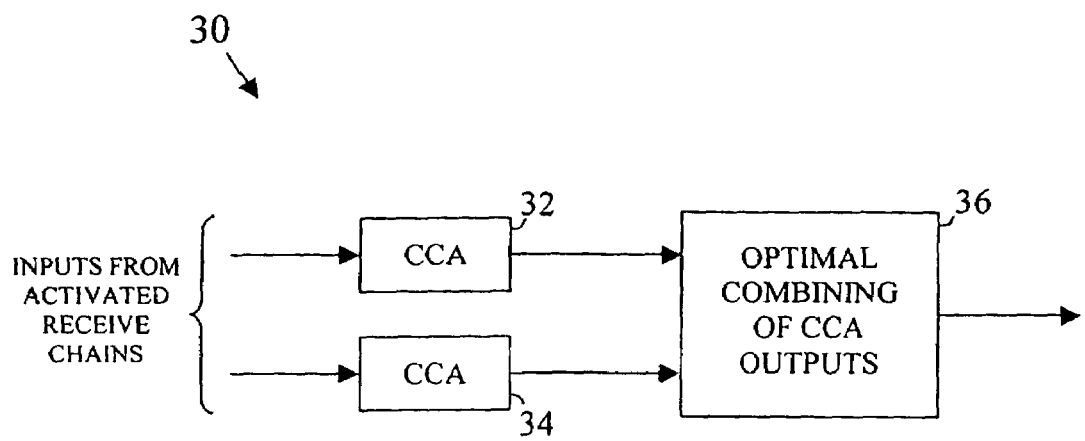
FIG. 2 is a block diagram illustrating an architecture for calculating a clear channel assessment (CCA) value in accordance with an embodiment of the present invention.
Figure 3:
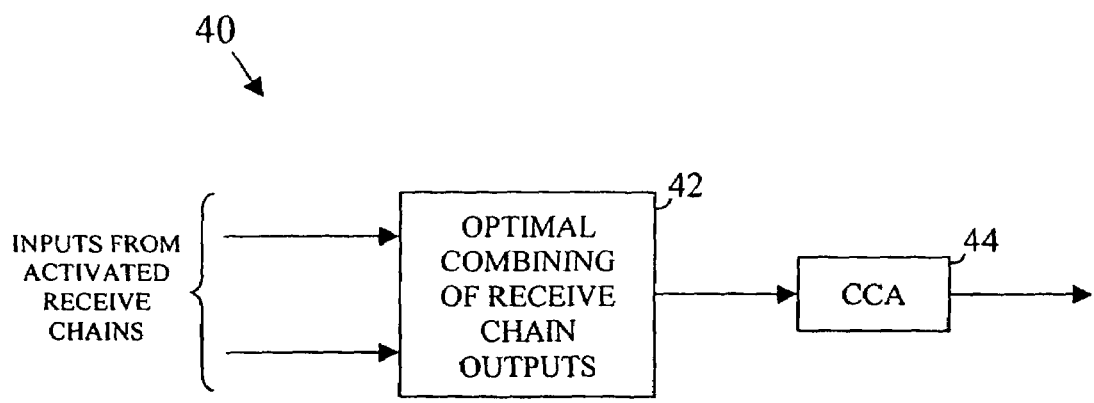
FIG. 3 is a block diagram illustrating an architecture for calculating a CCA value in accordance with another embodiment of the present invention.

The signals from the activated receive chains may be processed in any of a number of different manners. If only a single receive chain/antenna is selected to perform the CCA, then the CCA statistic may be generated as usual. If multiple receive chains/antennas are selected to perform the CCA, then some form of combining may be used. As shown in FIG. 2, in one possible approach, a separate CCA calculator 32, 34 may be provided to generate a CCA value for each of the activated receive chains. The CCA outputs may then be optimally combined in a combiner 36 to generate the overall CCA statistic. In another approach, as illustrated in FIG. 3, the outputs of the activated receive chains may first be combined in a combiner 42 and the combined output then delivered to a CCA calculator 44 to generate an overall CCA statistic. In still another approach, a subset of available receive chains may be activated one after another with a CCA statistic being calculated and stored for each. The stored CCA statistics may then be combined to generate an overall CCA parameter. Similarly, subsets of available receive chains may be activated one after another with a corresponding receive signal being stored for each subset. The stored receive signals may then be combined and an overall CCA parameter generated. Other techniques may alternatively be used. The CCA statistics from activated receive chains or subsets of receive chains may be combined in different ways. Some examples are: selection of the best statistic, summation of statistics, or a weighted summation of statistics.

In some embodiments of the invention, the subset of receive chains that are activated for use during medium sensing operations may vary with time. In one approach, for example, one or more receive chains may be selected for use during a CCA operation based on information gathered during one or more previous packet receptions. For example, if a most recently received packet had a highest received signal strength (e.g., a received signal strength indication (RSSI) value, etc.) on a particular antenna, then that antenna (and the associated receive chain) may be selected to perform the next CCA operation. Similarly, the two (or more) antennas having the highest receive signal strengths during a most recent reception may be selected, and so on. Other criteria may alternatively be used (e.g., the highest signal-to-noise ratio (SNR)), bit error rate (BER), packet error rate(PER), etc.). In another possible approach, receive chains may be selected for use during medium sensing operations on a round robin basis. For example, with reference to FIG. 1, receive chain 20 may be used during a first CCA operation, receive chain 22 during a next CCA operation, and so on, eventually returning to receive chain 20. Similarly, predetermined receive chain combinations may be used in a round robin arrangement. For example, receive chains 20 and 22 may be used during a first CCA operation, receive chains 22 and 24 during a next CCA operation, and so on, eventually returning to receive chains 20 and 22. In addition, changes may be made in the order in which receive chains are used based on knowledge of device conditions. For example, in at least one embodiment, if a device has knowledge that one of its receive antennas or receive chains is bad, it may decide to skip that antenna during CCA operations. Further, the number of receive chains activated during CCA operations may be increased or decreased over time based on, for example, current channel conditions. For example, in a noisy environment, more receive chains may be used to perform CCA operations. Other techniques for selecting receive chains for use during CCA operations may alternatively be used. For example, when the battery life of the device runs low, some of the receive chains may be switched off during CCA.

The techniques and structures of the present invention may be implemented in any of a variety of different forms. For example, features of the invention may be embodied within laptop, palmtop, desktop, and tablet computers having wireless capability; personal digital assistants having wireless capability; cellular telephones and other handheld wireless communicators; pagers; satellite communicators; cameras having wireless capability; audio/video devices having wireless capability; wireless network interface cards (NICs) and other network interface structures; integrated circuits; as instructions and/or data structures stored on machine readable media; and/or in other formats. Examples of different types of machine readable media that may be used include floppy diskettes, hard disks, optical disks, compact disc read only memories (CD-ROMs), magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data. In at least one form, the invention is embodied as a set of instructions that are modulated onto a carrier wave for transmission over a transmission medium.

It should be appreciated that the individual blocks illustrated in the block diagrams herein may be functional in nature and do not necessarily correspond to discrete hardware elements. For example, two or more of the blocks in a block diagram may be implemented within a single digital processing device. The digital processing device may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others. Hardware, software, firmware, and hybrid implementations may be used.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. An apparatus comprising:
a plurality of analog receive chains to process signals received from a wireless medium; and
a controller to activate M receive chains within said plurality of analog receive chains during data receive operations and less than M receive chains within said plurality of analog receive chains during medium sensing operations, wherein M is a positive integer greater than 1 and receive chains that are not used during a medium sensing operation are deactivated during said medium sensing operation to conserve energy.

2. The apparatus of claim 1, wherein:
said controller to activate only one of said receive chains within said plurality of analog receive chains during medium sensing operations.

3. The apparatus of claim 1, wherein:
said controller to activate multiple receive chains within said plurality of analog receive chains during medium sensing operations.

4. The apparatus of claim 1, wherein:
said controller to select one or more receive chains from said plurality of analog receive chains to use during a medium sensing operation based on a predetermined criterion.

5. The apparatus of claim 1, wherein:
said controller to select one or more receive chains within said plurality of analog receive chains to use during medium sensing operations based on information from a previously received data packet.

6. The apparatus of claim 1, wherein:
said controller to select one or more receive chains within said plurality of analog receive chains to use during medium sensing operations using a round robin approach.

7. The apparatus of claim 1, wherein:
said apparatus is configured in accordance with the IEEE 802.11 wireless networking standard; and
said medium sensing operations include clear channel assessment (CCA) operations.

8. The apparatus of claim 1, wherein:
said plurality of analog receive chains includes M receive chains.

9. A method comprising:
providing a wireless device having multiple receive antennas, each of said multiple receive antennas having a corresponding receive chain, said wireless device to perform both data receive operations and medium sensing operations;
activating M receive chains within said wireless device during data receive operations, wherein M is a positive integer greater than 1; and
activating less than M receive chains within said wireless device during medium sensing operations to conserve energy.

10. The method of claim 9, wherein:
said less than M receive chains includes only one receive chain.

11. The method of claim 9, wherein:
said less than M receive chains includes multiple receive chains.

12. The method of claim 9, wherein:
said wireless device includes a total of M receive chains.

13. The method of claim 9, wherein:
said wireless device is configured in accordance with the IEEE 802.11 wireless networking standard; and
said medium sensing operations include clear channel assessment (CCA) operations.

14. The method of claim 9, further comprising:
determining which receive chains within said wireless device to activate during a medium sensing operation based on a predetermined criterion.

15. The method of claim 9, further comprising:
determining which receive chains within said wireless device to activate during a medium sensing operation based on information from a previously received data packet.

16. The method of claim 9, further comprising:
determining which receive chains within said wireless device to activate during a medium sensing operation based on a round robin sequence.

17. An apparatus comprising:
a plurality of antennas including at least one dipole antenna;
a plurality of receive chains to process signals received from a wireless medium, each receive chain in said plurality of receive chains being coupled to an antenna in said plurality of antennas; and
a controller to activate M receive chains within said plurality of receive chains during data receive operations and less than M receive chains within said plurality of receive chains during medium sensing operations, wherein M is a positive integer greater than 1 and receive chains that are not used during a medium sensing operation are deactivated during said medium sensing operation to conserve energy.

18. The apparatus of claim 17, wherein:
said controller to select one or more receive chains from said plurality of receive chains to use during a medium sensing operation based on a predetermined criterion.

19. The apparatus of claim 17, wherein:
said apparatus is configured in accordance with the IEEE 802.11 wireless networking standard; and
said medium sensing operations include clear channel assessment (CCA) operations.

20. An article comprising a computer readable storage medium having computer executable instructions stored thereon that, when executed by a computing platform, operate to:
activate M receive chains within a wireless device during data receive operations, wherein M is a positive integer greater than 1, wherein said wireless device includes multiple receive antennas, each of said multiple receive antennas having a corresponding receive chain; and
activate less than M receive chains within said wireless device during medium sensing operations to conserve energy.

21. The article of claim 20, wherein:
said wireless device is configured in accordance with the IEEE 802.11 wireless networking standard; and
said medium sensing operations include clear channel assessment (CCA) operations.

22. The article of claim 20, wherein said instructions further operate to:
determine which receive chains within said wireless device to activate during a medium sensing operation based on a predetermined criterion.

* * * * *